(12) United States Patent  (10) Patent No.: US 7,151,841 B2
Sato  (45) Date of Patent: Dec. 19, 2006

(54) METHOD FOR ADJUSTING DATA INSERTION DEGREE AND DATA INSERTION CIRCUIT

(75) Inventor: Shinobu Sato, Tokyo (JP)

(73) Assignee: NEC Corporation, Tokyo (JP)

( * ) Notice: Subject to any disclaimer, the term of this patent is extended or adjusted under 35 U.S.C. 154(b) by 872 days.

(21) Appl. No.: 09/871,372

(22) Filed: May 31, 2001

(65) Prior Publication Data

US 2001/0053235 A1 Dec. 20, 2001

(30) Foreign Application Priority Data

May 31, 2000 (JP) ............................. 2000-161860

(51) Int. Cl.
*G06K 9/00* (2006.01)

(52) U.S. Cl. ..................................... 382/100

(58) Field of Classification Search ................ 382/100, 382/232, 190, 192, 194, 239
See application file for complete search history.

(56) References Cited

U.S. PATENT DOCUMENTS

| 5,825,892 A | * | 10/1998 | Braudaway et al. | .......... 380/51 |
| 6,111,990 A | * | 8/2000 | Sugaya et al. | .............. 382/250 |
| 6,229,924 B1 | * | 5/2001 | Rhoads et al. | .............. 382/232 |
| 6,330,672 B1 | * | 12/2001 | Shur | ........................... 713/176 |
| 6,345,104 B1 | * | 2/2002 | Rhoads | ....................... 382/100 |
| 6,415,041 B1 | * | 7/2002 | Oami et al. | ................. 382/100 |

FOREIGN PATENT DOCUMENTS

| JP | 10-243398 | 9/1998 |
| JP | 11-55639 | 2/1999 |
| JP | 11-341450 | 12/1999 |

* cited by examiner

*Primary Examiner*—Jingge Wu
*Assistant Examiner*—Tom Y. Lu
(74) *Attorney, Agent, or Firm*—Scully, Scott, Murphy & Presser, P.C.

(57) ABSTRACT

A VLD decodes MPEG2 data so as to generate RUN and Level therefrom. A multiplication unit multiplies target data to be added to the Level, and sends a multiplied result to an adder. The adder adds the target data to the Level. The VLC codes the MPEG2 data, using the RUN and the Level to which the target data is added. The selector compares the data length of the MPEG2 data which has been decoded by the VLC with the data length of the original MPEG2 data. If those data lengths coincide with each other, the selector selects the MPEG2 data output by the VLC. On the contrary, if those data lengths do not coincide with each other, the selector selects and outputs the original MPEG2 data. A counter counts the number of times the selector has done the selection, while another counts the number of times the selector has selected the data output by the VLC. The comparator compares the counted values of both of the counters, and adjusts the insertion degree based on a result of the comparison.

24 Claims, 6 Drawing Sheets

FIG.3

| FRAME NUMBER | N | N+1 | N+2 | N+3 | ..... |
|---|---|---|---|---|---|
| MULTIPLIER | 1 | 2 | 3 | 2 | ..... |
| FIRST COUNTER | 100 | 100 | 100 | 100 | ..... |
| SECOND COUNTER | 25 | 30 | 35 | 30 | ..... |
| SECOND COUNTER / FIRST COUNTER (%) | 25 | 30 | 35 | 30 | ..... |
| THRESHOLD VALUE (%) | 50 | 40 | 30 | 40 | ..... |

FIG.5

| FRAME NUMBER | N | N+1 | N+2 | N+3 | ..... |
|---|---|---|---|---|---|
| INSERTION DEGREE | 1 | 2 | 3 | 2 | ..... |
| FIRST COUNTER | 100 | 100 | 100 | 100 | ..... |
| NUMBER OF SELECTED MPEG2 DATA TO WHICH DATA IS INSERTED | 10 | 15 | 20 | 16 | ..... |
| SECOND COUNTER | 10 | 30 | 60 | 32 | ..... |
| SECOND COUNTER / FIRST COUNTER (%) | 10 | 30 | 60 | 32 | ..... |
| THRESHOLD VALUE (%) | 50% | 50% | 50% | 50% | ..... |

METHOD FOR ADJUSTING DATA INSERTION DEGREE AND DATA INSERTION CIRCUIT

BACKGROUND OF THE INVENTION

1. Field of the Invention

The present invention relates to a data insertion circuit and data insertion method for inserting data into compressed image data, etc.

2. Description of the Related Art

Conventionally, data insertion circuits have been used for inserting data, including a digital watermark, etc., into compressed digital image data.

The structure of a conventional data insertion circuit will be described with reference to FIG. 6.

A data insertion circuit 3 shown in FIG. 6 is prepared for inserting predetermined data into digital image data which has been compressed according to the MPEG-2 (Moving Pictures Experts Group 2) standard. A VLD (Variable Length Decoder) 101 decodes data which has been variable-length coded. A data generator 102 generates data to be inserted into the compressed image data. A multiplication unit 103 adjusts an insertion degree at which the target data to be inserted is inserted into image data. An adder 104 adds target data to the original compressed image data. A VLC 105 (Variable Length Coder) 105 variable-length codes target data. A selector 106 selects either one of the variable-length coded data of the original data to which the data has been inserted and the original variable-length coded data.

Operations of the data insertion circuit 3 will now be described. The compressed MPEG2 data is variable-length coded. The VLD 101 decodes the supplied MPEG2 data so as to generate a RUN and Level.

Target data to be inserted to the image data is generated by the data generator 102. Thus generated data is multiplied by a constant number (an insertion degree at which target data is inserted into image data) by the multiplication unit 103, thereafter to be added to the Level by the adder 104. By this addition, data including a digital watermark, etc. is inserted into the image data. The Level including the data added to it and the original RUN are variable-length coded by the VLC 105 so as to be set as MPEG2 data. Since the Level has been changed in its data contents, the code length of the variable-length coded data may differ from the code length (the code length of the original MPEG2 data) of the original data. Hence, if the MPEG2 data which is variable-length coded is used as is, the data length of the entire MPEG2 data may change, resulting in forming damaged MPEG2 data. In consideration of this, the selector 106 selects and outputs a VLC code into which data is inserted, if the code length of the MPEG2 data has not been changed from the original code length. On the contrary, the selector 106 selects and outputs the original code, if the code length of the MPEG2 data has been changed from the original code length somehow.

The data which has been inserted into the image data is detected by a non-illustrative detector. However, depending on the original MPEG2 data, the inserted data may not be detected. This may occur in the case where the code length of the inserted data is unlikely to coincide with the code length of the original data, and/or where the original image data is rarely replaced with the image data into which data is inserted.

In such cases, the multiplier of the multiplication unit 103 is increased, and a large amount of data is inserted into the image data. Then, it is necessary that the amount of data to be inserted into the entire image data is increased, so as to appropriately detect the inserted data.

To desirably insert data into image data with the utilization of the conventional data insertion circuit, it is necessary to:

1) insert the data into the image data;
2) pass output data to a detector, and check whether the inserted data can be detected; and
3) increase an insertion degree (increase a value of the data to be inserted) and try to insert the data again, if the data could not be detected. The conventional data insertion circuit can not be adopted to a system which executes the insertion process in real time.

Further techniques for inserting arbitrary data into image data are disclosed in Unexamined Japanese Patent Applications KOKAI Publication Nos. H10-243398, H11-55639, H11-34145. None of the above techniques include a system for executing the insertion process in real time.

SUMMARY OF THE INVENTION

The present invention has been made in consideration of the above. It is accordingly an object of the present to provide a data insertion circuit and method for inserting target data, while automatically setting an adequate insertion degree at which the target data is inserted into original data.

Another object thereof is to provided a data insertion circuit and method for desirably inserting data into original data.

In order to achieve the above objects, according to the first aspect of the present invention, there is provided a data-insertion-degree adjustment method for adjusting second data into first data, said method comprising:

inserting said second data into said first data at a predetermined insertion degree, and so as to create third data;

selecting either data of said first data and said third data;

counting number NA of times selection is made in said selecting and number N3 of times said third data is selected;

comparing a predetermined threshold value with a proportion N3/NA of the number N3 to the number NA; and changing an insertion degree at which the second data is inserted into the first data, by increasing the insertion degree, in a case where the proportion N3/NA is smaller than the threshold value.

The first data may be data in unit of frames;

the counting may include counting number NA of times selection is made in said selecting per frame and the number N3 of times the third data is selected per frame; and the changing the insertion degree may include increasing the insertion degree for a next frame, in the case where the proportion N3/NA is smaller than the threshold value.

The inserting may include:

creating the second data to be inserted into the first data;

creating fourth data, by multiplying the created second data by the predetermined insertion degree; and creating the third data by inserting the fourth data into the first data.

The counting may include counting up by one, every time the third data is selected.

The counting may include counting up by a value corresponding to the predetermined insertion degree, every time the third data is selected.

The changing may include increasing the insertion degree and decreasing the threshold value, in the case where the proportion N3/NA is smaller than the threshold value.

The changing may include increasing the insertion degree in accordance with the number N3, in the case where the proportion is smaller than the threshold value.

The inserting may include:

variable-length decoding the first data which is variable-length coded data, so as to output a RUN and Level;

creating fifth data by adding the fourth data, which has been obtained by multiplying the second data by the predetermined insertion degree, to the output Level; and creating variable variable-length coded data as the third data, by variable-length coding the fifth data and the output RUN.

The first data may be created according to MPEG2 standard.

The selecting may include:

comparing includes comparing a data length of the third data and a data length of the first data;

selecting the third data in a case where the data length of the third data coincides with the data length of the first data; and selecting the first data in a case where the data length of the third data does not coincide with the data length of the first data.

In order to achieve the above objects, according to the second aspect of the present invention, there is provided a data insertion circuit for inserting second data into first data, said circuit comprising:

an insertion circuit which inserts the second data into the first data at a predetermined insertion degree so as to create third data;

a selection circuit which selects either data of the first data and third data;

a counter which counts number NA of times selection is made in said selection circuit and number N3 of times the third data is selected and an adjustment circuit which adjusts the insertion degree, based on the numbers counted by said counter.

The adjustment circuit may include a comparison circuit which compares a predetermined threshold value with a proportion of the number N3 to the number NA which are counted by said counter, and increases the insertion degree, in a case where the proportion of the number N3 to the number NA is smaller than the threshold value.

The first data may be data in unit of frames;

said counter may count the number NA of times selection is made by said selection circuit per frame and the number N3 of times the third data is selected per frame; and said comparison circuit may compare the proportion N3/NA of the number N3 to the number NA with the predetermined threshold value, and increases the insertion degree for a next frame, in the case where the proportion N3/NA of the number N3 to the number NA is smaller than the threshold value.

The insertion circuit may include:

a data creation circuit which creates the second data;

a multiplication unit which creates fourth data by multiplying the created second data by the insertion degree; and an adder which creates the third data by adding the first and fourth data.

The counter may include:

a first counter which counts number of times the selection is made by said selection circuit; and a second counter which counts up by one, every time said selector selects the third data The comparison circuit may increase the insertion degree and decreases the threshold value, in a case where a value, obtained by dividing the number counted by said second counter by a number counted by said first counter, is smaller than the threshold value.

The counter may include a first counter which counts number of times selections is made by said selection circuit, and a second counter which counts up a value representing the insertion degree, every time the third data is selected.

The comparison circuit may increase the insertion degree and decreases the threshold value, in a case where a value, obtained by dividing the number counted by said second counter by a number counted by said first counter, is smaller than the threshold value.

The comparison circuit may increase the insertion degree and decreases the threshold value, in the case where the proportion N3/NA is smaller than the threshold value.

The comparison circuit may increase the insertion degree in accordance with the number N3, in the case where the proportion N3/NA is smaller than the threshold value.

The insertion circuit may include:

a variable-length decoder circuit which variable-length decodes the first data which is variable-length coded data, so as to output a RUN and Level;

an adder which adds fourth data, obtained by multiplying the second data by the insertion degree, to the output level, so as to create fifth data; and a variable-length coder device which variable-length codes the fifth data and the output RUN, so as to create variable-length coded data which is the third data.

The variable-length coded data may be created according to MPEG2 standard.

The selection circuit may:

compare a data length of the third data and a data length of the first data;

select the third data in a case where the data length of the third data coincides with the data length of the first data; and select the fist data in a case where the data length of the third data does not coincide with the data length of the first data.

BRIEF DESCRIPTION OF THE DRAWINGS

These objects and other objects and advantages of the present invention will become more apparent upon reading of the following detailed description and the accompanying drawings in which:

FIG. 3 is a diagram for explaining conditions in which the insertion degree varies;

FIG. 5 is a diagram for explaining conditions in which insertion degree varies.

DETAILED DESCRIPTION OF THE PREFERRED EMBODIMENTS

A data insertion circuit according to the first embodiment of the present invention will now be explained with reference to the accompanying drawings.

Figure 1:
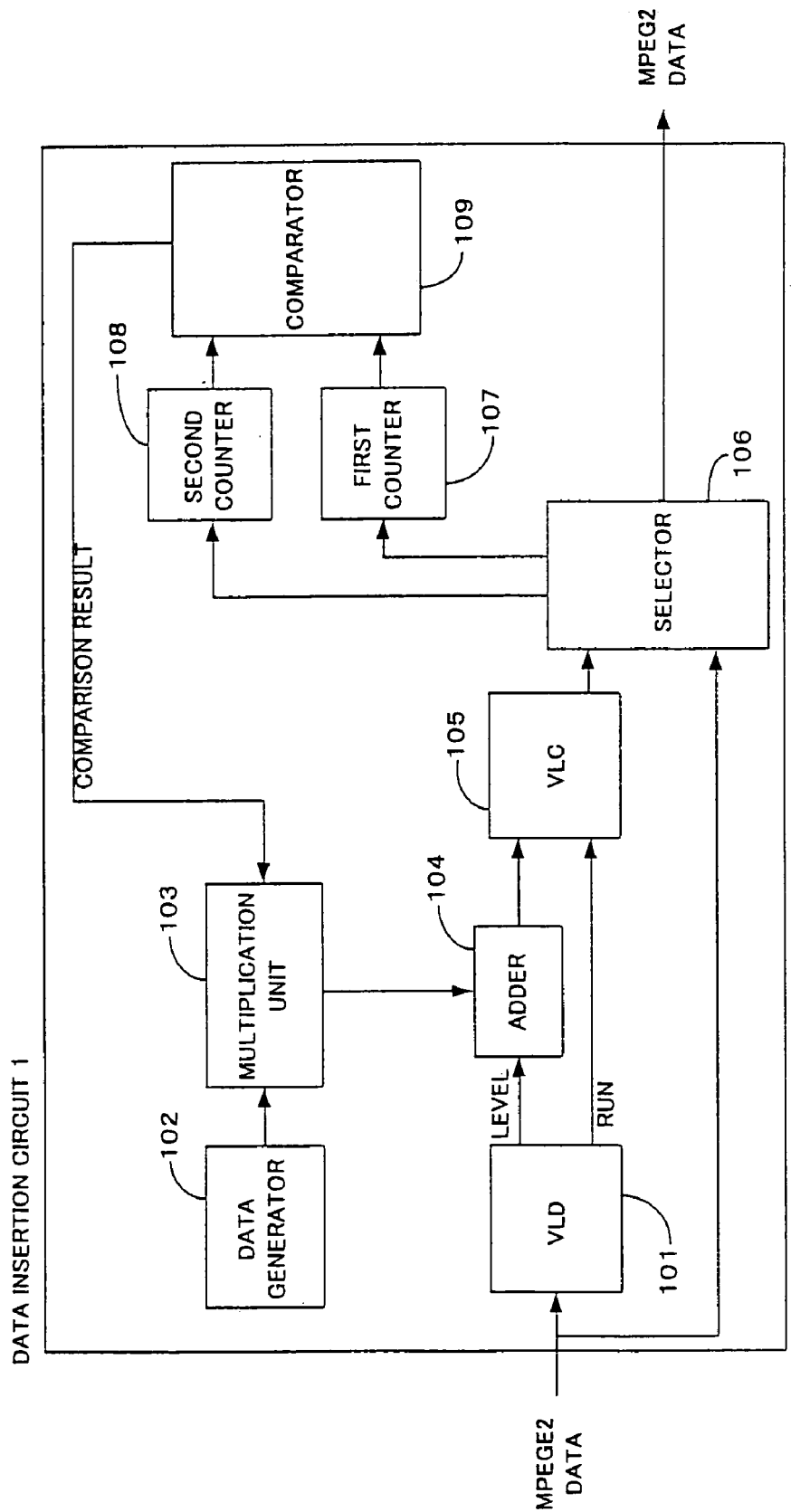
FIG. 1 is a block diagram showing a data insertion circuit according to the first embodiment of the present invention.

As shown in FIG. 1, a data insertion circuit 1 comprises a VLD (Variable Length Decoder) 101, a data generator 102, a multiplication unit 103, an adder 104, a VLC (Variable Length Coder) 105, a selector 106, the first counter 107, the second counter 108, and a comparator 109.

The VLD 101 variable-length decodes image data, in the format of MPEG2 standard, which is sent from an external circuit, so as to generate a RUN and Level from the image data.

The data generator 102 generates data to be inserted into the image data into the MPEG2 data.

The multiplication unit 103 multiplies the data generated by the data generator 102 by a predetermined value α (=insertion degree or insertion intensity).

The adder 104 adds the Level output by the VLD 101 to data (target data to be inserted) output by the multiplication unit 103.

The VLC 105 variable-length codes the Level and RUN into which data is inserted.

The selector 106 selects either data of the variable-length code into which the data is inserted and the original data formed in the format of MPEG2.

The first counter 107 counts the number of times the selector 106 has performed the selection, whereas the second counter 108 counts the number of times the selector 106 has selected the variable-length code (the output of the VLC 105) into which the data is inserted.

The comparator 109 compares the counted values of the respective first and second counters 107 and 108, and informs the multiplication unit 103 about the compared values.

The multiplication unit 103 adjusts the multiplier α, in accordance with the information sent from the comparator 109.

Operations of the data insertion circuit 1 will now be explained with reference to FIG. 1.

Target MPEG2 data into which data is to be inserted is sent to the VLD 101. The VLD 101 decodes the MPEG2 data, so as to generate a Level and RUN. The data generator 102 forms target data to be inserted into the MPEG2 data, and supplies the multiplication unit 103 with the formed data. The multiplication unit 103 multiplies the supplied data by a value α (an insertion degree) so as to adjust the insertion degree at which the target data is inserted into the MPEG2 data. In this case, the multiplication unit 103 multiplies the supplied data by 1 (an initial value), for example.

The adder 104 adds the Level output from the VLD 101 to the data to be inserted which is output from the multiplication unit 103, resulting in inserting the data into the image data. The VLC 105 receives the Level, including the data inserted thereto, and the RUN output from the VLD 101, and variable-length codes the received data.

The selector 106 compares the data (the output of the VLC 105), including the data inserted thereto and being variable-length coded, with the original MPEG2 data. The selector 106 selects the data, including the data inserted thereto and being variable-length coded, only if its code length coincides with that of the original MPEG2 data. Otherwise, i.e. the code length of the data, including the inserted data, does not coincide with that of the original MPEG2 data, the selector 106 selects the original MPEG2 data. This enables data to be inserted into the MPEG2 data, without changing the data length of the entire MPEG2 data.

The first counter 107 shows the number of times the selector 106 has selected the MPEG2 data, whereas the second counter 108 shows the number of times the selector 106 has selected the code data including the inserted data. Hence, by referring to the values shown by the first and second counters 107 and 108, it is possible to know in which code within a plurality of codes, the data has been inserted.

The comparator 109 compares the values shown by the counters 107 and 108, for each frame of an image. For example, if the value of the second counter 108 is 50% smaller than the value of the First counter 107, the comparator 109 determines that the data has not been inserted into the image data sufficiently enough to be detected, and informs the multiplication unit 103 about the determination. Upon this, the multiplication unit 103 increases the multiplier α for the following frame by 1 (i.e. the multiplier is now 2). Then, the multiplication unit 103 increases an insertion degree at which target data is inserted into image data, so that the data which has been inserted into the image data is to be detected with ease.

If the multiplier α used by the multiplication unit 103 is thus increased, the data inserted into the image data can be easily detected, even in the case where the same number of the MPEG2 data items including the inserted data is selected as when the multiplier α is small. Hence, the threshold value which is used by the comparator 109 comparing the values of the counters 107 and 108 is decreased to 40%.

Having performed the above, more than a predetermined insertion degree can automatically be set, and thus obtaining a desired insertion degree, so that the inserted data can easily be detected.

Figure 2:
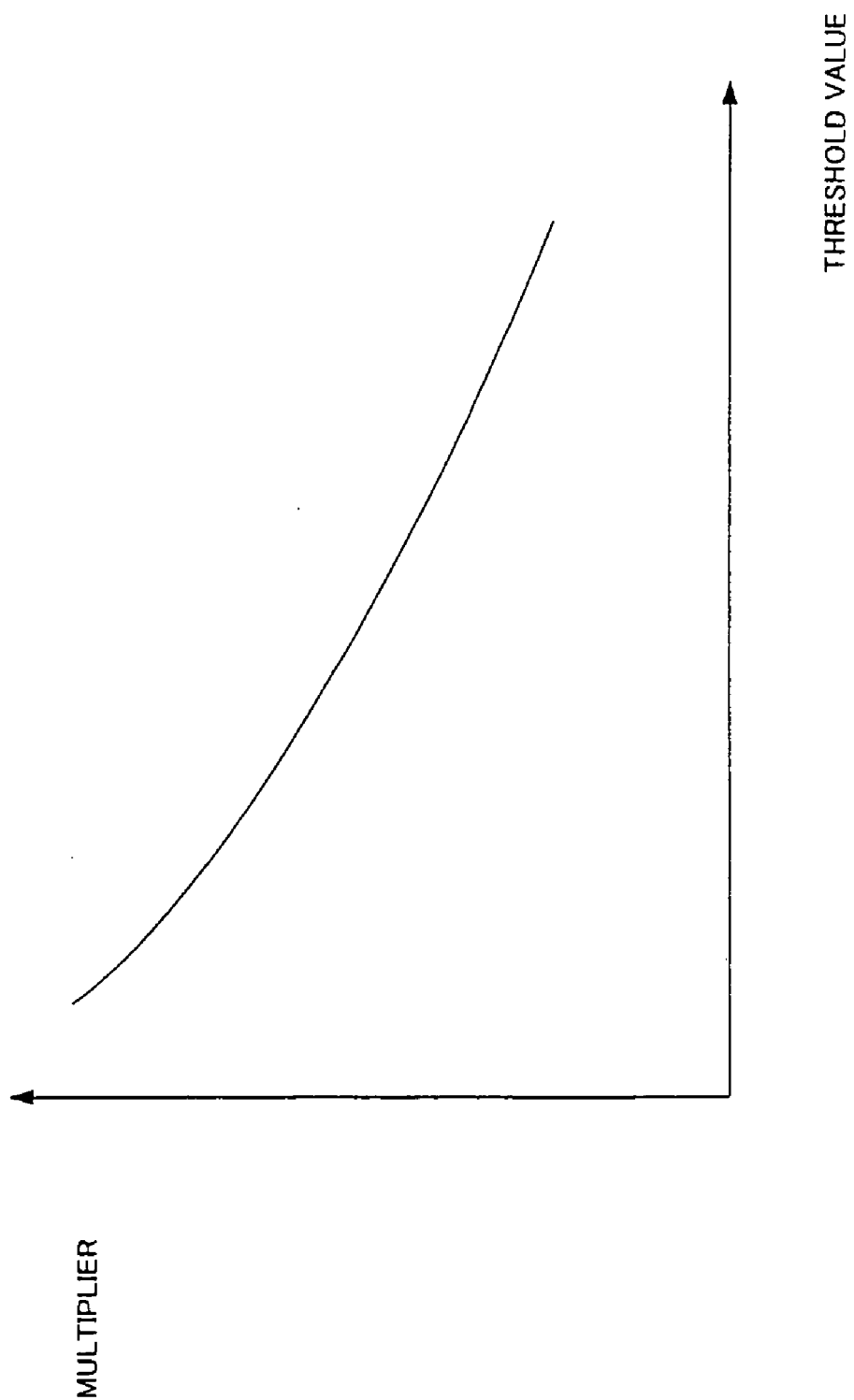
FIG. 2 is a diagram showing the relationship between insertion degrees and threshold values.

Generally, there is a trade off between the multiplier α of the multiplication unit 103 and the threshold value of the comparator 109, as shown in FIG. 2.

Thus, as exemplarily shown in FIG. 3, the multiplier α and threshold value Th vary for each frame of image data. In the example of FIG. 3, "(Number of Selected Data Items Inserted Into Image Data)/(Entire Number of Selected Data Items)" is larger than the threshold value, in the "n+2-th" frame. Hence, in the "n+2-th" frame, the multiplier α is decreased to 2, while its corresponding threshold value is increased to 40%. Alternatively, in such a case, the multiplier α may be retained at 3.

A data insertion circuit 2 according to the second embodiment of the present invention will now be explained with reference to FIG. 4.

Figure 4:
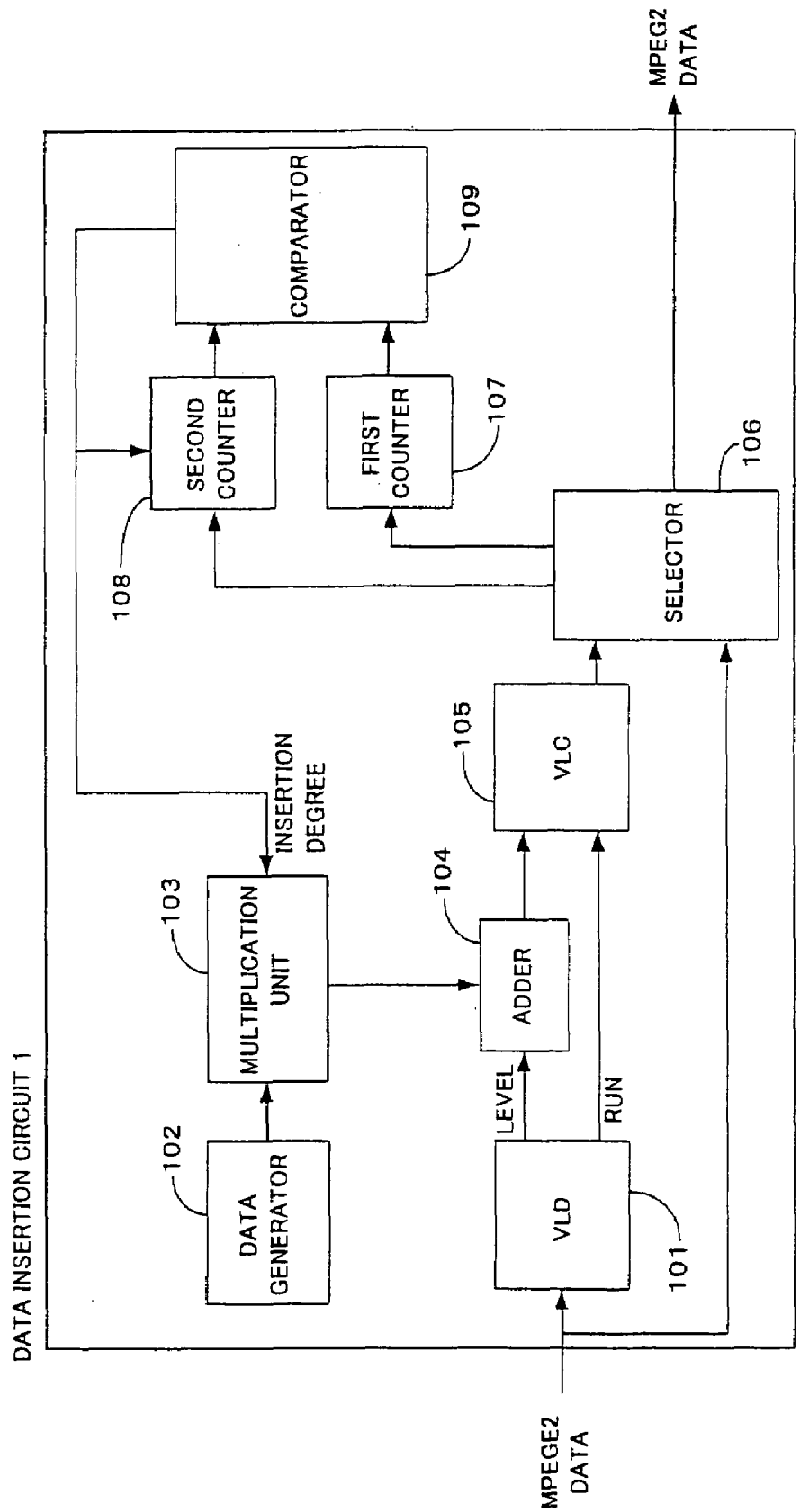
FIG. 4 is a block diagram showing a data insertion circuit according to the second embodiment of the present invention.
Figure 6:
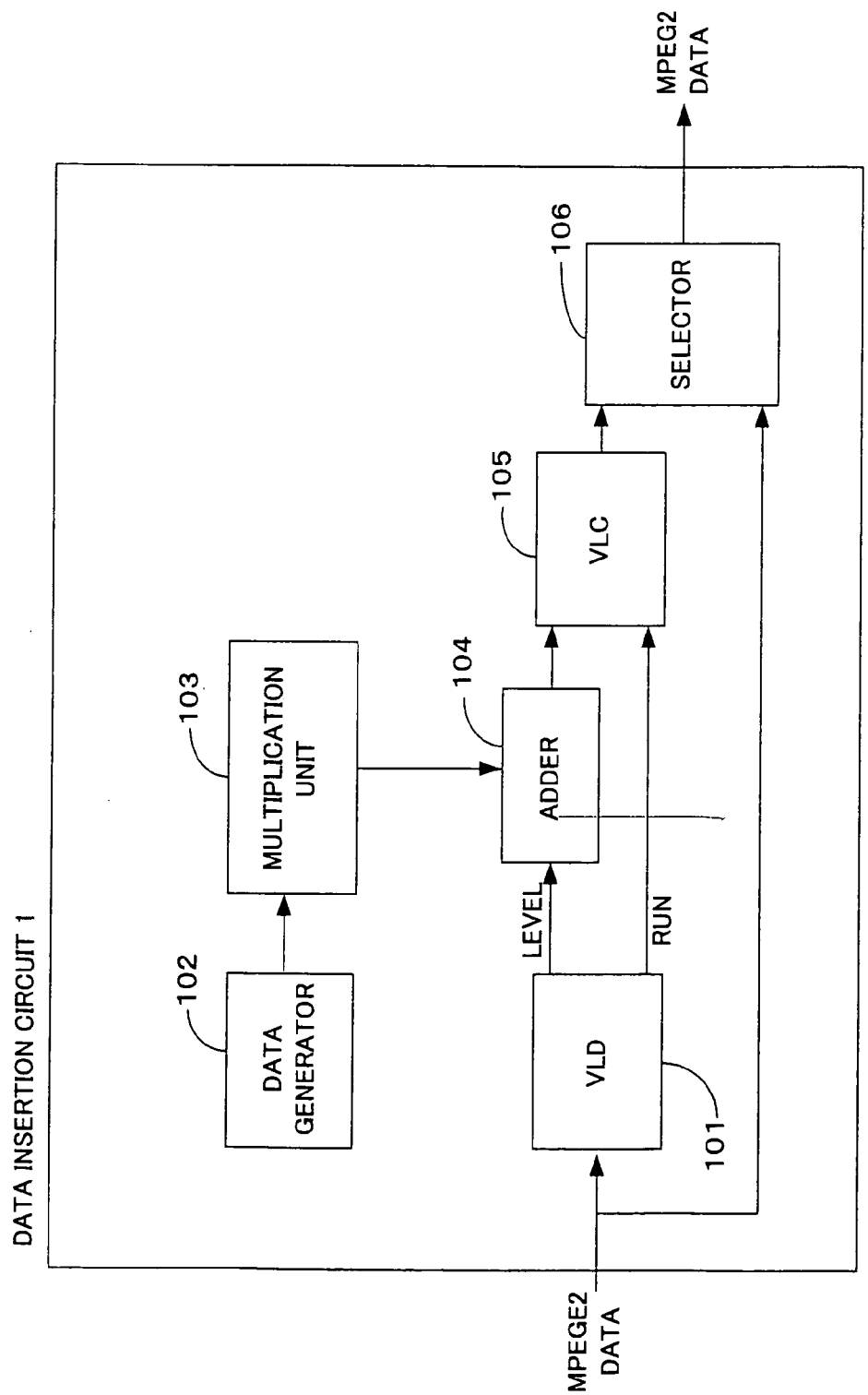
FIG. 6 is a block diagram showing a conventional data insertion circuit.

In FIG. 4, the multiplication unit 103 multiplies the inserted data, which is output from the data generator 102, by an insertion degree β output from the comparator 109, and sends a multiplied result to the adder 104. Likewise the first embodiment, the VLD 101 variable-length decodes the MPEG2 data is variable/length, so as to generate a Level and RUN.

The adder 104 adds data to the Level output from the VLD 101, and the VLC 105 variable-length codes the data including the data inserted thereto. The selector 106 selects data output by the VLC 105, only if the code length (the data length) of the data output by the VCL, 105 coincides with the code length of the original MPEG2 data. On the contrary, the selector 106 selects the original MPEG2 data, if the code lengths do not coincide with each other.

The first counter 107 shows the number of times the selector 106 has selected data (either the original MPEG2 data or the MPEG2 data from VLC 105). On the other hand, the second counter 108 adds, to its own counted value, a value representing the insertion degree β output by the comparator 109, if the selector 106 has selected the data output by the VLC 105. The insertion degree β output by the comparator 109 is set to "1". The comparator 109 divides the value of the second counter 108 by the value of the first counter 107 by each frame. The comparator 109 compares [(the value of the second counter 108)/(the value of the first counter 107)] with the threshold value 50% (fixed) by each frame. In the case where the value of the second counter 108 which is divided by the value of the first counter 107 is smaller than the threshold value, for example, the insertion degree β output by the comparator 109 is increased by one, and set to 2, and the case where the value of the second counter 108 which is divided by the value of the first counter 107 is greater than the threshold value, the insertion degree β is decreased by one, then operations will be proceeded for the following frame.

FIG. 5 shows an example of the variation of the insertion degree β and threshold value Th, in association with each frame.

For the "n-th" frame, the insertion degree β is 1, the "Number of MPEG2 Data Items selected by the selector 106" is 100, and the "Number of Selected MPEG2 Data Items from VLC 105 To Which Data is Inserted" is 10. In this case, at the end of the frame, the value counted by the first counter 107 is 100, and the value counted by the second counter 108 is 10 (=1×10). The counted value of the second counter 108 which is divided by the counted value of the first counter 107 is equal to 10%, which is smaller than the threshold value 50%. Hence, the comparator 109 changes the insertion degree to 2 for the "n+1-th" frame.

For the next "n+1-th" frame, the number of selected data items is 100, whereas the number of selected MPEG2 data items to which data is inserted is 15. In this case, at the end of this frame, the counted value of the first counter 107 is 100, and the counted value of the second counter is 30 (=2×15). The counted value of the second counter which is divided by the counted value of the first counter is equal to 30%, which is smaller than the threshold value 50%. For the "n+2-th" frame, the comparator 109 changes the insertion degree β to 3.

For the next "n+2-th" frame, the number of selected data items is 100, and the number of selected data items to which data is inserted is 20. In this case, at the end of the frame, the counted value of the first counter 107 is 100, and the counted value of the second counter is 60 (=3×20). The counted value of the second counter which is divided by the counted value of the first counter is equal to 60%, which is larger than threshold value 50%. Hence, for the "n+3-th" frame, the comparator 109 decreases the insertion degree β to 2. Note that the insertion degree β may be retained at 3 for those frames following the "n+3-th" frame.

Having performed the above, appropriate insertion degree β can automatically be set, so that the inserted data can easily be detected using the set insertion degree β.

The explanations have been made to the present invention based on the preferred embodiments thereof. However, the present invention is not limited to the above. Various embodiments and changes may he made thereonto without departing from the broad spirit and scope of the invention by the skilled in the art.

For example, in the first embodiment, the threshold value may be fixed, and in the second embodiment, the threshold value is fixed. However, it may be changed in accordance with the counted value of the second counter which is divided by the counted value of the first counter.

In the above-described embodiments, in the case where the counted value of the second counter which is divided by the counted value of the first counter is smaller than the threshold value, the insertion degree is increased by 1. However it is not limited to "1", and it may be any other value. Further, the insertion degree may be changed in accordance with the counted value of the second counter or a value obtained by dividing, the counted value of the second counter by the counted value of the first counter.

For example, in the case where the counted value of the second counter 108 is equal to or smaller than the threshold value and reference value (20%, for example), the insertion degree may be increased by 2. On the contrary, in the case where the counted value of the second counter 108 is equal to or smaller than the threshold value and larger than the reference value, the insertion degree may be increased by 1. Similarly, in the case where a value, obtained by dividing the counted value of the second counter by the counted value of the first counter, is equal to or smaller than 10%, the insertion degree is increased by 3. On the contrary, in the case where the value, obtained by dividing the counted value of the second counter by the counted value of the first counter, is in a range between 10% and 30%, the insertion degree is increased by 2. In the case where the value, obtained by dividing the counted value of the second counter by the counted value of the first counter, is in a range between 30% and the threshold value, the insertion degree is increased by 1.

In the above-described embodiments, the insertion degree is multiplied by the data generated by the data generator. However, the insertion degree may be added to the generated data.

The above-described embodiments are intended to illustrate the present invention, not to limit the scope of the present invention. The scope of the present invention is shown by attached claims rather than the embodiment. Various modifications made within the meaning of an equivalent of the claims of the invention and within the claims are to be regarded to be in the scope of the present invention.

This application is based on Japanese Patent Application No. 2000-16180 filed on May 31, 2000, and including specification, claims, drawings and summary. The disclosure of the above Japanese Patent Application is incorporated herein by reference in its entirety.

What is claimed is:

1. A data-insertion-degree adjustment method for the
    inserting said second data into said first data at a predetermined insertion degree, so as to create third data;
    selecting either data of said first data or said third data;
    counting a number NA of times selection is made in said selecting and number N3 of times said third data is selected;
    comparing a predetermined threshold value with a proportion N3/NA of the number N3 to the number NA; and
    changing an insertion degree at which the second data is inserted into the first data, by increasing the insertion degree, in a case where the proportion N3/NA is smaller than the threshold value.

2. The method according to claim 1, wherein:
    the first data is data in unit of frames;
    said counting includes counting number NA of times selection is made in said selecting per frame and the number N3 of times the third data is selected per frame; and
    said changing the insertion degree includes increasing the insertion degree for a next frame, in the case where the proportion N3/NA is smaller than the threshold value.

3. The method according to claim 1, wherein said inserting includes:
    creating the second data to be inserted into the first data;
    creating fourth data, by multiplying the created second data by the predetermined insertion degree; and creating the third data by inserting the fourth data into the first data.

4. The method according to claim 1, wherein said counting includes counting up by one, every time the third data is selected.

5. The method according to claim 1, wherein said counting includes counting up by a value corresponding to the predetermined insertion degree, every time the third data is selected.

6. The method according to claim 1, wherein said changing includes increasing the insertion degree and decreasing the threshold value, in the case where the proportion N3/NA is smaller than the threshold value.

7. The method according to claim 1, wherein said changing includes increasing the insertion degree in accordance with the number N3, in the case where the proportion is smaller than the threshold value.

8. The method according to claim 1, wherein said inserting includes:
variable-length decoding the first data which is variable-length coded data, so as to output a RUN and Level;
creating fifth data by adding the fourth data, which has been obtained by multiplying the second data by the predetermined insertion degree, to the output Level; and
creating variable variable-length coded data as the third data, by variable-length coding the fifth data and the output RUN.

9. The method according to claim 8, wherein the first data is created according to MPEG2 standard.

10. The method according to claim 1, wherein said selecting includes:
comparing includes comparing a data length of the third data and a data length of the first data;
selecting the third data in a case where the data length of the third data coincides with the data length of the first data; and
selecting the first data in a case where the data length of the third data does not coincide with the data length of the first data.

11. A data insertion circuit for inserting second data into first data, said circuit comprising:
an insertion circuit which inserts the second data into the first data at a predetermined insertion degree so as to create third data;
a selection circuit which selects either data of the first data or third data;
a counter which counts a number NA of times selection is made in said selection circuit and a number N3 of times the third data is selected; and
an adjustment circuit which adjusts the insertion degree, based on the numbers counted by said counter,
said selection circuit:
compares a data length of the third data and a data length of the first data;
selects the third data in a case where the data length of the third data coincides with the data length of the first data; and
selects the first data in a case where the data length of the third data does not coincide with the data length of the first data.

12. A data insertion circuit for inserting second data into first data, said circuit comprising:
an insertion circuit which inserts the second data into the first data at a predetermined insertion degree so as to create third data;
a selection circuit which selects either data of the first data or third data;
a counter which counts a number NA of times selection is made in said selection circuit and a number N3 of times the third data is selected; and
an adjustment circuit which adjusts the insertion degree, based on the numbers counted by said counter, wherein said adjustment circuit includes a comparison circuit which compares a predetermined threshold value with a proportion of the number N3 to the number NA which are counted by said counter, and increases the insertion degree, in a case where the proportion of the number N3 to the number NA is smaller than the threshold value.

13. The data insertion circuit according to claim 12, wherein:
the first data is data in unit of frames;
said counter counts the number NA of times selection is made by said selection circuit per frame and the number N3 of times the third data is selected per frame; and
said comparison circuit compares the proportion N3/NA of the number N3 to the number NA with the predetermined threshold value, and increases the insertion degree for a next frame, in the case where the proportion N3/NA of the number N3 to the number NA is smaller than the threshold value.

14. The data insertion circuit according to claim 12, wherein said insertion circuit includes:
a data creation circuit which creates the second data;
a multiplication unit which creates fourth data by multiplying the created second data by the insertion degree; and
an adder which creates the third data by adding the first and fourth data.

15. The data insertion circuit according to claim 12, wherein said counter includes:
a first counter which counts number of times the selection is made by said selection circuit; and
a second counter which counts up by one, every time said selector selects the third data.

16. The data insertion circuit according to claim 15, said comparison circuit increases the insertion degree and decreases the threshold value, in a case where a value, obtained by dividing the number counted by said second counter by a number counted by said first counter, is smaller than the threshold value.

17. The data insertion circuit according to claim 12, wherein said counter includes a first counter which counts number of times selections is made by said selection circuit, and a second counter which counts up a value representing the insertion degree, every time the third data is selected.

18. The data insertion circuit according to claim 17, wherein said comparison circuit increases the insertion degree and decreases the threshold value, in a case where a value, obtained by dividing the number counted by said second counter by a number counted by said first counter, is smaller than the threshold value.

19. The data insertion circuit according to claim 12, wherein said comparison circuit increases the insertion degree and decreases the threshold value, in the case where the proportion N3/NA is smaller than the threshold value.

20. The data insertion circuit according to claim 12, wherein said comparison circuit increases the insertion degree in accordance with the number N3, in the case where the proportion N3/NA is smaller than the threshold value.

21. The data insertion circuit according to claim 12, wherein said insertion circuit includes:
- a variable-length decoder circuit which variable-length decodes the first data which is variable-length coded data, so as to output a RUN and Level;
- an adder which adds fourth data, obtained by multiplying the second data by the insertion degree, to the output Level, so as to create fifth data; and
- a variable-length coder device which variable-length codes the fifth data and the output RUN, so as to create variable-length coded data which is the third data.

22. The data insertion circuit according to claim 21, wherein the variable-length coded data is created according to MPEG2 standard.

23. A method of inserting second data into first data, said method comprising:
- inserting the second data into the first data at a predetermined insertion degree so as to create third data;
- selecting either the first data or third data;
- counting a number NA of times selection is made at said selecting and a number N3 of times the third data is selected; and
- adjusting the insertion degree, based on at least one of the numbers NA and N3 counted at said counting, wherein said adjusting includes adjusting the insertion degree by comparing a predetermined threshold value with a proportion of the number N3 to the number NA.

24. A method of inserting second data into first data, said method comprising:
- inserting the second data into the first data at a predetermined insertion degree so as to create third data;
- selecting either the first data or third data;
- counting a number NA of times selection is made at said selecting and a number N3 of times the third data is selected; and
- adjusting the insertion degree, based on at least one of the numbers NA and N3 counted at said counting, said selecting step includes:
- comparing a data length of the third data and a data length of the first data;
- selecting the third data in a case where the data length of the third data coincides with the data length of the first data; and
- selecting the first data in a case where the data length of the third data does not coincide with the data length of the first data.

* * * * *